(12) United States Patent
Kim

(10) Patent No.: US 7,378,187 B2
(45) Date of Patent: May 27, 2008

(54) INTEGRATED CAP ASSEMBLY OF A SECONDARY BATTERY AND FABRICATING METHOD THEREOF

(75) Inventor: Young Taek Kim, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 624 days.

(21) Appl. No.: 10/966,905

(22) Filed: Oct. 14, 2004

(65) Prior Publication Data

US 2005/0084752 A1 Apr. 21, 2005

(30) Foreign Application Priority Data

Oct. 15, 2003 (KR) .................... 10-2003-0071948

(51) Int. Cl.
*H01M 2/08* (2006.01)
*H01M 6/00* (2006.01)

(52) U.S. Cl. ............... 429/185; 429/180; 429/178; 429/176; 29/623.2

(58) Field of Classification Search ........... 429/180, 429/181, 178, 184, 185, 186, 57, 62, 7, 174, 429/53, 61; 29/623.2, 623.4
See application file for complete search history.

(56) References Cited

U.S. PATENT DOCUMENTS 6,777,128 B2 * 8/2004 Kim ........................... 429/54

FOREIGN PATENT DOCUMENTS

KR 2002-0071179 9/2002

OTHER PUBLICATIONS

Korean Patent Abstract for Korea Publication No. 1020020071179 A, dated Sep. 9, 2002.
English translation of Chinese Office action dated Dec. 8, 2006, for CN 2004100836749.

* cited by examiner

*Primary Examiner*—Raymond Alejandro
(74) *Attorney, Agent, or Firm*—Christie, Parker & Hale, LLP

(57) ABSTRACT

An integrated cap assembly of a secondary battery. A cap lamination forms a top portion of the secondary battery and serves as a connection terminal while the secondary battery is charged or discharged. A gasket is molded integrally with the cap lamination in such a manner that a peripheral portion of the cap lamination is inserted in the gasket, the gasket insulating the cap lamination from a can of the secondary battery and sealing a gap between the cap lamination and the can.

4 Claims, 3 Drawing Sheets

INTEGRATED CAP ASSEMBLY OF A SECONDARY BATTERY AND FABRICATING METHOD THEREOF

CROSS REFERENCE TO RELATED APPLICATION

This application claims priority to and the benefit of Korea Patent Application No. 10-2003-0071948 filed on Oct. 15, 2003 in the Korean Intellectual Property Office, the entire content of which is incorporated herein by reference.

BACKGROUND OF THE INVENTION

1. Field of the Invention

The present invention relates to a secondary battery, and more particularly, to a structure of a cap assembly forming a top of a secondary battery and a method fabricating the same.

2. Description of the Related Art

As is generally known in the art, secondary batteries are rechargeable and can be fabricated in a smaller size with a larger capacity. Secondary batteries may be classified into nickel-hydrogen (Ni-MH) batteries, lithium (Li) batteries, lithium ion (Li-ion) batteries, and polymer lithium (PLI) batteries according to the materials of the secondary batteries, or into cylinder type batteries and square type batteries according to their appearances.

According to a typical method of fabricating a secondary battery, an electrode assembly including a positive electrode plate, a negative electrode plate and a separator is seated in a can generally made from aluminum or an aluminum alloy, electrolyte is injected into the can, and the can assembly is then sealed. Each can has an electrode terminal, which is formed at an upper portion of the can, is insulated from the can, and has a polarity of positive or negative, determining a polarity of the can. In addition, each can includes a positive temperature coefficient (PTC) element, a thermal fuse, and a protection circuit module (PCM).

The secondary battery employs an electrode structure in a "jelly-roll" configuration formed by winding a positive electrode plate, a negative electrode plate, and a separator interposed between the positive electrode plate and the negative electrode plate, together. The shape of the battery determines the shape of the jelly-roll employed by the battery. That is, a cylinder type battery employs a jelly-roll wound in a cylindrical shape, and a square type battery employs a jelly-roll wound in a polygonal shape having angular corners and flat sides.

FIG. 1 is a sectional view of a conventional secondary battery having a typical construction. As shown in FIG. 1, a cylinder type secondary battery includes electrode assembly 110 for generating potential difference, cylinder-type can 120 for receiving electrode assembly 110, cap assembly 130 assembled with a top of cylinder-type can 120, so as to prevent electrode assembly 110 from being separated from cylinder-type can 120, and electrolyte 140 injected in cylinder-type can 120, so as to enable movement of ions between electrodes of electrode assembly 110. Cap assembly 130 has various safety devices provided at cap assembly 130.

Cylinder-type can 120 has clamp portion 121 bent inward so as to push cap assembly 130 inward and a bead portion 122 depressed inward so as to push cap assembly 130 upward.

Cap assembly 130 includes conductive safety vent unit 131, current breaker 132, PTC element 133, and positive electrode cap 134. Conductive safety vent unit 131 has a bottom welded to a positive electrode lead 111 and has a convex portion which is inverted when the battery is excessively charged or abnormally heated. Current breaker 132 is disposed above and is electrically and mechanically connected to conductive safety vent unit 131. Current breaker 132 has a circuit which is cut off when the convex portion of conductive safety vent unit 131 is inverted. PTC element 133 is disposed above and is electrically and mechanically connected to current breaker 132. PTC element 133 is electrically cut off when heated exceeding a predetermined temperature. Positive electrode cap 134 is disposed above and is electrically and mechanically connected to PTC element 133. Positive electrode cap 134 allows current to flow to the exterior. Insulating gasket 135 surrounds circumferential portions of conductive safety vent unit 131, current breaker 132, PTC element 133, and positive electrode cap 134, stacked on each other, and insulates them from cylinder-type can 120.

However, in cap assembly 130 of the conventional cylinder-type secondary battery, conductive safety vent unit 131, current breaker 132, PTC element 133, and positive electrode cap 134 are simply stacked on each other, and central portion 135a, lower clip portion 135b, and upper clip portion 135c of insulating gasket 135 are simply in contact with the circumferential portion of cap assembly 130 including conductive safety vent unit 131, current breaker 132, PTC element 133 and positive electrode cap 134, stacked on each other. Therefore, insulating gasket 135 cannot sufficiently seal the gap between the interior and the exterior of the can and may allow internal gas of the can to leak through a nip between cap assembly 130 and insulating gasket 135 when the internal pressure has excessively increased.

SUMMARY OF THE INVENTION

In accordance with the present invention an integrated cap assembly of a secondary battery and a method of fabricating the same is provided wherein the cap assembly includes a cap lamination and an insulating gasket surrounding and clamping the cap lamination with an increased tightness. In exemplary embodiments the cap lamination includes at least one among a conductive safety vent unit, a current breaker, a PTC element, and a positive electrode cap.

Also in accordance with the present invention an integrated cap assembly of a secondary battery and a method of fabricating the same is provided which can simplify the process of fabricating the secondary battery, thereby increasing the productivity and reducing the manufacturing cost.

Further in accordance with the present invention an integrated cap assembly of a secondary battery is provided which includes a cap lamination and a gasket integrated with each other in a state that a peripheral portion of the cap lamination is inserted in the gasket, wherein the cap lamination includes a conductive safety vent unit, a current breaker, a PTC element, and a positive electrode cap. In an exemplary embodiment a groove or hole is formed at a peripheral portion of a lowermost element of the cap lamination, so that a portion of the insulating gasket is inserted in the groove or hole, thereby enhancing the assembling force between the cap lamination and the insulating gasket.

DETAILED DESCRIPTION

Figure 1:
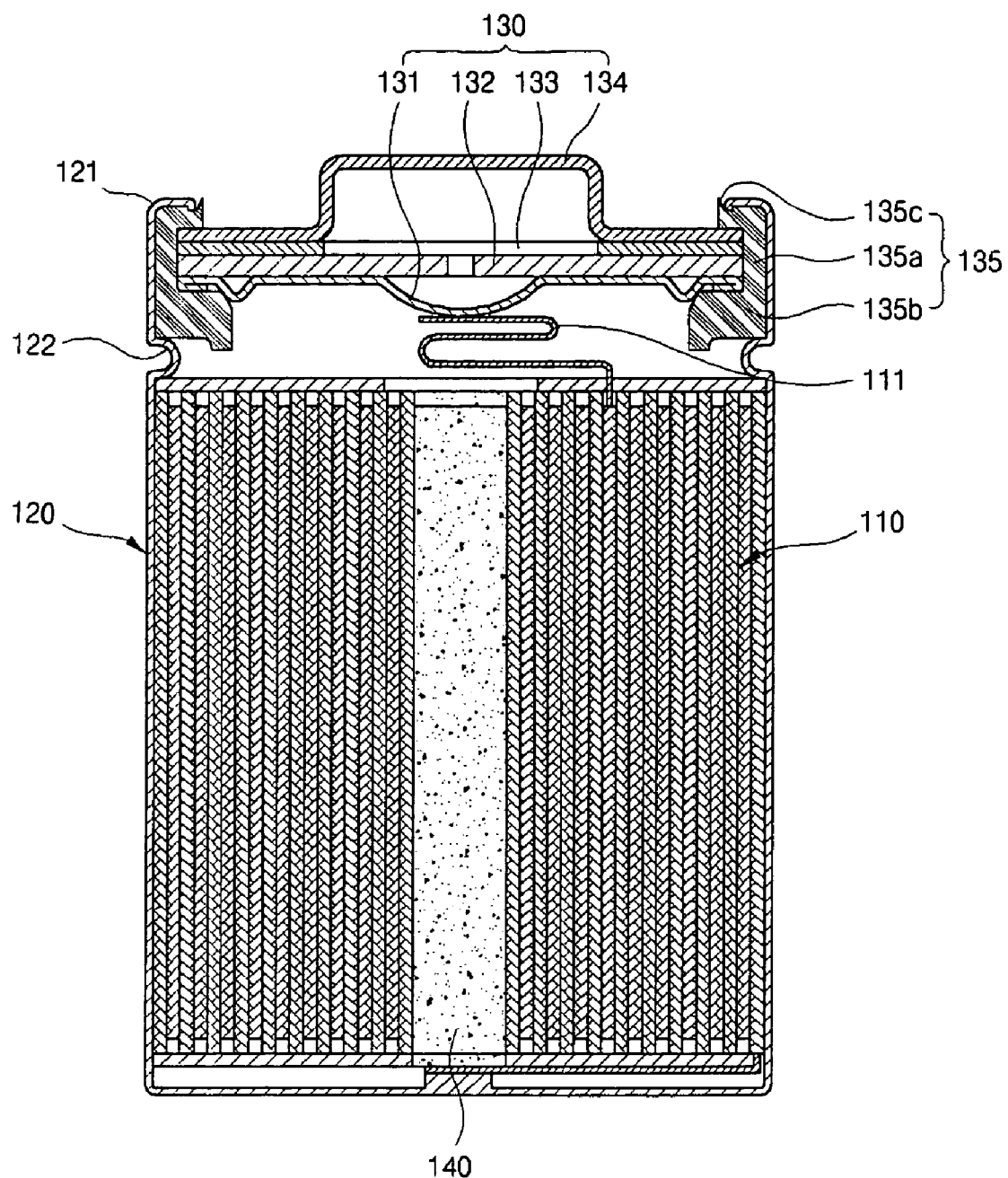
FIG. 1 is a sectional view of a conventional cylinder-type secondary battery.
Figure 2:
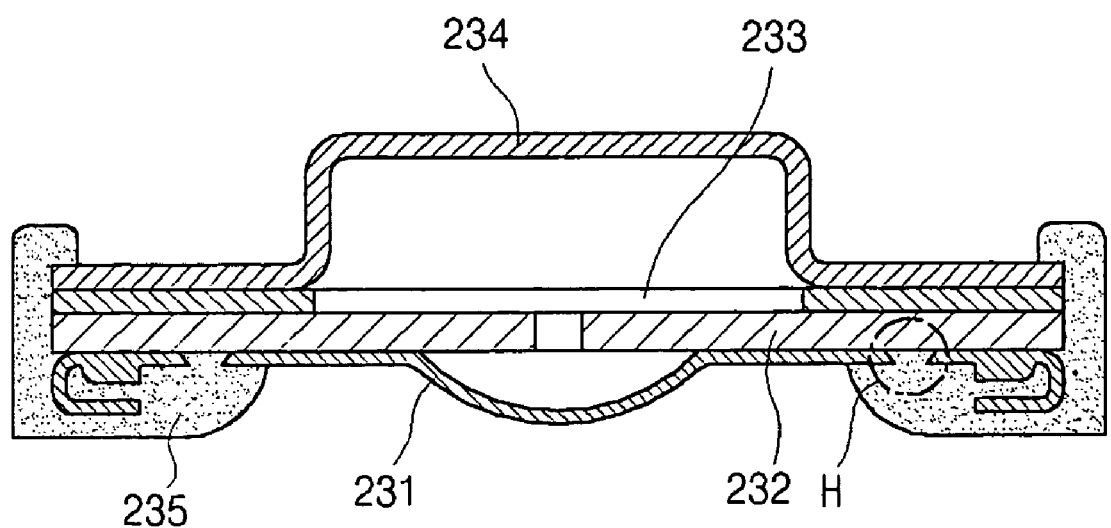
FIG. 2 is a sectional view of a cap assembly according to an exemplary embodiment of the present invention.

Referring now to FIG. 2, an exemplary embodiment of a cap assembly according to the present invention includes a cap lamination and insulating gasket 235. The cap lamination includes conductive safety vent unit 231, current breaker 232, PTC element 233, and positive electrode cap 234.

Conductive safety vent unit 231 seals a can of the secondary battery and can be bent outward (upward in the drawing) by a pressure generated in the secondary battery. Conductive safety vent unit 231 has a central portion which is deformed or convex inward (downward in the drawing) in a normal state. The downward convex or deformed portion of conductive safety vent unit 231 is electrically connected with a positive electrode tab extending from a positive electrode plate of an electrode assembly placed in the can of the secondary battery.

Current breaker 232 is disposed above conductive safety vent unit 231 and transfers electric current supplied from the positive electrode tab to positive electrode cap 234. Current breaker 232 has a current-interrupting means which is broken and interrupts electric current flow by the deformation of conductive safety vent unit 231 when the internal pressure of the battery exceeds a predetermined value due to abnormal operation such as excessive charging, etc. Current breaker 232 is usually made from an epoxy-based resin. Current breaker 232 includes a traverse extending over and across the deformed portion of conductive safety vent unit 231 and a ring-shaped member connected to opposite ends of the traverse. The traverse has a breakable portion which can be torn by the force applied by the deformed portion of conductive safety vent unit 231 when the deformed portion of conductive safety vent unit 231 is inverted. The breakable portion is a weakened portion having slits formed through central and end portions of the traverse. The breakable portion may have either a single kind of at least two slits, or combination of slits and grooves.

PTC element 233 is a current regulator, which instantly increases the resistance to regulate or interrupt the current flow when the temperature of the battery increases beyond a safety limit. PTC element 233 is optional in a cap assembly of a secondary battery according to the present invention.

Positive electrode cap 234 has a plurality of pores. Positive electrode cap 234 is an element which may come into contact with an external terminal.

The cap lamination including the elements as described above is assembled with insulating gasket 235. In order to assemble the cap lamination with insulating gasket 235, the cap lamination is inserted in and is integrally formed with insulating gasket 235 when insulating gasket 235 is molded. Then, a portion of the edges of the cap lamination is inserted into insulating gasket 235. Edges of each element of the cap lamination integrally molded in insulating gasket 235, i.e., each of conductive safety vent unit 231, current breaker 232, PTC element 233, and positive electrode cap 234, are individually integrated with insulating gasket 235. Therefore, the cap lamination and insulating gasket 235 are completely integrated with each other without any gap between them. Here, when some elements such as PTC element 233 are omitted in the cap lamination, only the other elements of the cap lamination are stacked on each other and then inserted in insulating gasket 235 while insulating gasket 235 is molded.

Further, groove H, which in exemplary embodiments may be an annular through-hole or alternatively a recess, is formed at a peripheral portion of current breaker 232, which is the lowermost element of the cap lamination. As a result, when insulating gasket 235 is molded, a portion of insulating gasket 235 is inserted in groove H, thereby enhancing the assembling force between the cap lamination and insulating gasket 235. It is exemplary that groove H has a shape of a wedge having an upper portion wider than a lower portion thereof. Here, groove H may have not only a frusto-conical shape but also various shapes including shapes of polygonal prisms, such as triangular prisms, rectangular prisms, pentagonal prisms, etc. Further, although FIG. 2. shows groove H formed at the lowermost element of the cap lamination, a groove, hole or recess may be formed in and /or through the lower two elements or all the elements of the cap lamination.

Figure 3:
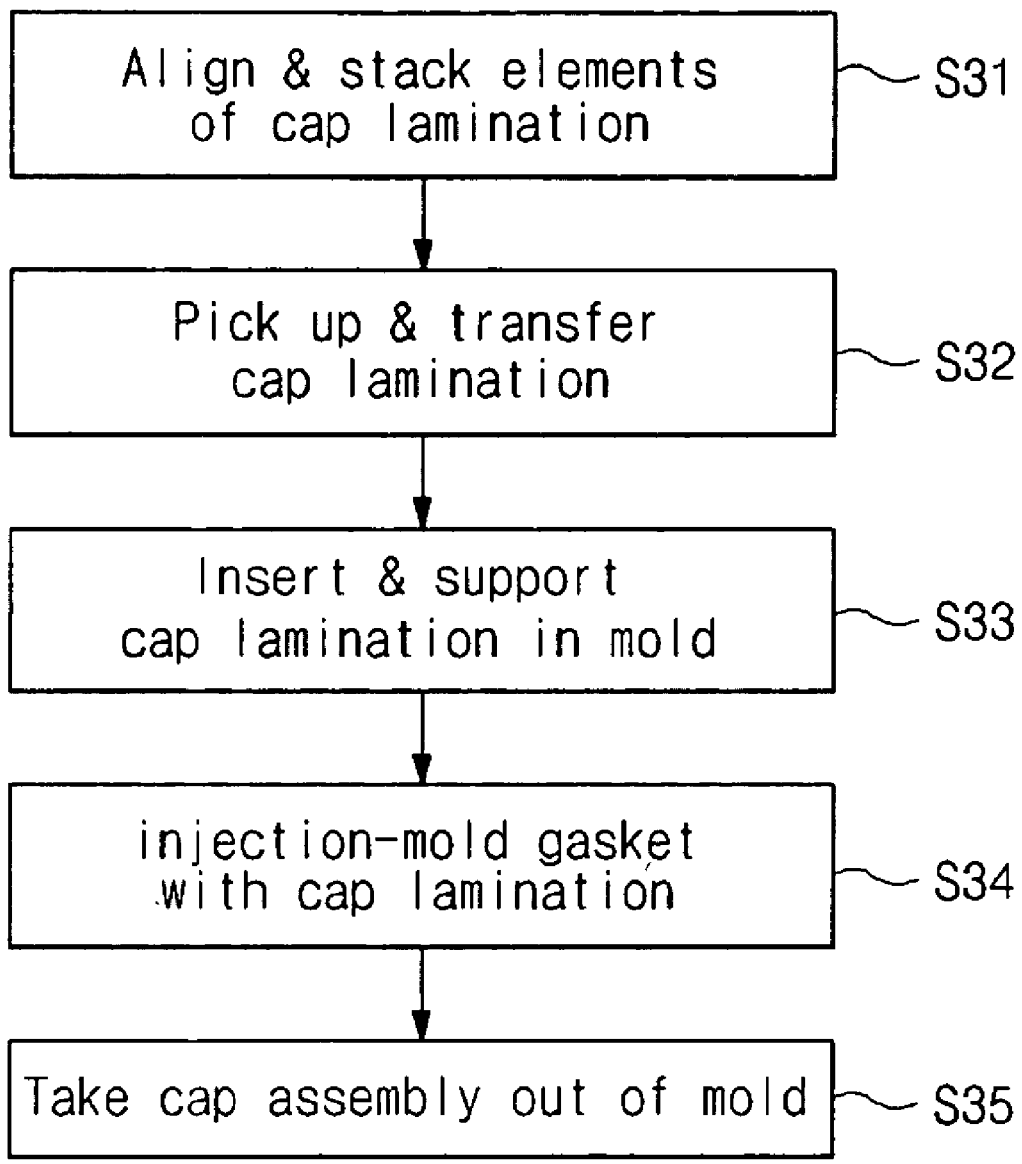
FIG. 3 is a flowchart showing a process for integrally molding a cap assembly according to an exemplary embodiment of the present invention.

FIG. 3 is a flowchart showing a process for integrally molding a cap assembly according to an exemplary embodiment of the present invention. As shown in FIG. 3, the method of injection-molding a cap assembly according to the present invention includes: aligning and stacking elements of a cap lamination on each other (S31); picking up and transferring the cap lamination (S32); inserting and supporting the cap lamination in a mold (S33); injecting a molding material, thereby injection-molding a gasket with the cap lamination (S34); and taking the cap assembly out of the mold (S35).

In the element aligning and stacking step (S31), conductive safety vent unit 231, current breaker 232, PTC element 233, and positive electrode cap 234, which constitute the cap lamination, are aligned and sequentially stacked one after another. Then, the aligned and stacked cap lamination is supported and held by a holder, such as a pneumatically-operated forced pin, etc. Here, the forced pin may have a shape of a clip and may be preferably from the same material as that of the gasket.

In the cap lamination pick up and transfer step (S32), the cap lamination having been supported and held by a forced pin, etc., is picked up and held by a dual pin, tweezers, etc., of an inserting jig and is then moved to the mold by a robot control operation.

In the cap lamination inserting and supporting step (S33), the cap lamination moved to the mold is inserted into the mold and is then held by a holding pin, etc., in order to perform injection-molding of the gasket. Here, it is exemplary that the holding pin is made from comparable material as that of the gasket.

In the injection-molding step (S34), the gasket is injection-molded in such a manner that edges of the gap lamination inserted and held in the mold are partially inserted in the gasket. Here, a hole or recess is formed at a lower element the cap lamination, and the molten gasket is inserted in the hole or recess during the injection-molding, thereby enhancing the assembling force between the cap lamination and the gasket. The gasket is made from polymer resin, which is an insulating material, such as polypropylene, etc.

In the step of the cap assembly take-out step (S35), the cap assembly including the cap lamination and the gasket, which are integrally injection-molded, is taken out of the mold and is then dropped on an outputting conveyer.

As described above, the present invention provides an integrated cap assembly for a secondary battery, thereby highly increasing tightness between a cap lamination of the cap assembly, including conductive safety vent unit 131, current breaker 132, PTC element 133, and positive electrode cap 134, and an insulating gasket surrounding and clamping the cap lamination. Further, a process of forming a cap assembly of a secondary battery according to the present invention enables the secondary battery to be assembled by only one apparatus, thereby greatly reducing the number of necessary apparatuses, the manufacturing time, the manufacturing cost, etc., for the fabrication of the secondary battery, and thereby increasing the productivity.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed:

1. A molded cap assembly of a secondary battery, the molded cap assembly comprising:
   a cap lamination having a peripheral end, the cap lamination forming a top portion of the secondary battery and serving as a connection terminal while the secondary battery is charged or discharged; and
   a gasket integrally molded around the peripheral end, the gasket insulating the cap lamination from a can of the secondary battery and sealing a gap between the cap lamination and the can;
   wherein the cap lamination has a groove or hole formed at a lowermost portion of the cap lamination;
   wherein a portion of the gasket is inserted into the goove or the hole; and
   wherein the groove or hole has an upper portion and a lower portion, the upper portion having a width larger than a width of the lower portion.

2. The molded cap assembly of claim 1, wherein the cap lamination includes at least one among a safety vent, a current breaker, a positive thermal coefficient element, and a positive electrode cap.

3. A method of fabricating a molded cap assembly of a secondary battery, the method comprising:
   (1) forming a cap lamination by aligning and sequentially stacking elements of the cap lamination, the cap lamination having a peripheral end;
   (2) inserting the cap lamination in a mold for molding a gasket around the peripheral end while maintaining an aligned and stacked state of the cap lamination; and (3) injecting a molding material into the mold, thereby forming the molded cap assembly, in which the gasket is molded integrally with the cap lamination;
   wherein forming a cap lamination includes forming a groove or hole at a peripheral portion of a lower surface of a lowermost portion of the cap lamination;
   wherein a portion of the gasket is inserted into the goove or the hole; and
   wherein the groove or hole has an upper portion and a lower portion, the upper portion having a width larger than a width of the lower portion.

4. The method of fabricating an integrated cap assembly of a secondary battery of claim 3, wherein an aligned and stacked state of the cap lamination is maintained by a clamp made from a material substantially the same as that of the gasket.

* * * * *

UNITED STATES PATENT AND TRADEMARK OFFICE
CERTIFICATE OF CORRECTION

PATENT NO. : 7,378,187 B2  Page 1 of 1
APPLICATION NO. : 10/966905
DATED : May 27, 2008
INVENTOR(S) : Young Taek Kim It is certified that error appears in the above-identified patent and that said Letters Patent is hereby corrected as shown below:

In the Claims

| | |
|---|---|
| Column 5, line 27, Claim 1 | Delete "or hole", Insert --or a hole-- |
| Column 5, line 31, Claim 1 | Delete "or hole", Insert --or the hole-- |
| Column 6, line 16, Claim 3 | Delete "wherein forming a cap", Insert --wherein the forming of the cap-- |
| Column 6, line 17, Claim 3 | Delete "or hole", Insert --or a hole-- |
| Column 6, line 21, Claim 3 | Delete "or hole", Insert --or the hole-- |

Signed and Sealed this
Twenty-eighth Day of December, 2010

David J. Kappos
*Director of the United States Patent and Trademark Office*